(12) United States Patent
Bacigalupo

(10) Patent No.: US 9,418,037 B2
(45) Date of Patent: Aug. 16, 2016

(54) SPI INTERFACE AND METHOD FOR SERIAL COMMUNICATION VIA AN SPI INTERFACE HAVING AN SPI PROTOCOL HANDLER FOR EVALUATING SIGNAL TRANSITIONS OF SPI SIGNALS

(75) Inventor: Tommaso Bacigalupo, Fuerstenfeldbruck (DE)

(73) Assignee: Infineon Technologies AG, Neubiberg (DE)

(*) Notice: Subject to any disclaimer, the term of this patent is extended or adjusted under 35 U.S.C. 154(b) by 363 days.

(21) Appl. No.: 13/546,092

(22) Filed: Jul. 11, 2012

(65) Prior Publication Data

US 2014/0019791 A1    Jan. 16, 2014

(51) Int. Cl.
G06F 1/12 (2006.01)
G06F 13/42 (2006.01)
H04J 3/06 (2006.01)
H04L 7/033 (2006.01)

(52) U.S. Cl.
CPC .............. *G06F 13/4291* (2013.01); *G06F 1/12* (2013.01); *H04J 3/0685* (2013.01); *H04L 7/0331* (2013.01); *Y02B 60/1228* (2013.01); *Y02B 60/1235* (2013.01)

(58) Field of Classification Search
CPC ............ G06F 13/4282; G06F 13/4291; G06F 13/1689; G06F 13/4295
USPC ......................................................... 713/400
See application file for complete search history.

(56) References Cited

U.S. PATENT DOCUMENTS

| | | | |
|---|---|---|---|
| 4,575,644 A * | 3/1986 | Leslie ........................... 327/198 |
| 5,878,234 A * | 3/1999 | Dutkiewicz et al. .......... 710/110 |
| 5,886,658 A * | 3/1999 | Amar et al. .................... 341/155 |
| 6,198,689 B1 * | 3/2001 | Yamazaki et al. ......... 365/233.1 |
| 6,389,580 B1 * | 5/2002 | Ozaki ............................ 716/104 |
| 7,020,076 B1 * | 3/2006 | Alkalai et al. ................ 370/217 |
| 8,058,902 B1 * | 11/2011 | Khurana ................... G06F 1/12 326/46 |
| 2004/0142680 A1 * | 7/2004 | Jackson et al. ............. 455/412.1 |
| 2007/0075869 A1 * | 4/2007 | Vazach et al. ................. 340/679 |
| 2008/0018511 A1 * | 1/2008 | Leonard et al. ............... 341/144 |
| 2008/0265955 A1 * | 10/2008 | Kejriwal ....................... 327/144 |
| 2009/0063736 A1 * | 3/2009 | Wilson et al. ................... 710/61 |

(Continued)

FOREIGN PATENT DOCUMENTS

| | | |
|---|---|---|
| CN | 102113367 A | 6/2011 |
| CN | 102437736 A | 5/2012 |

(Continued)

OTHER PUBLICATIONS

European Search Report dated Dec. 6, 2013 for EP Application 13003349.1-1956.

(Continued)

*Primary Examiner* — Thomas Lee
*Assistant Examiner* — Danny Chan
(74) *Attorney, Agent, or Firm* — Eschweiler & Associates, LLC

(57) ABSTRACT

In accordance with an aspect of the invention, there is provided an SPI interface including a plurality of synchronizers configured to receive a plurality of SPI signals and an internal clock signal and synchronize the received SPI signals using the internal clock signal. The SPI interface also includes an SPI protocol handler configured to receive the synchronized SPI signals and the internal clock signal, and detect and evaluate signal transitions of at least one of the synchronized SPI signals according to an SPI protocol.

25 Claims, 2 Drawing Sheets

(56) References Cited

U.S. PATENT DOCUMENTS

Figure 1:
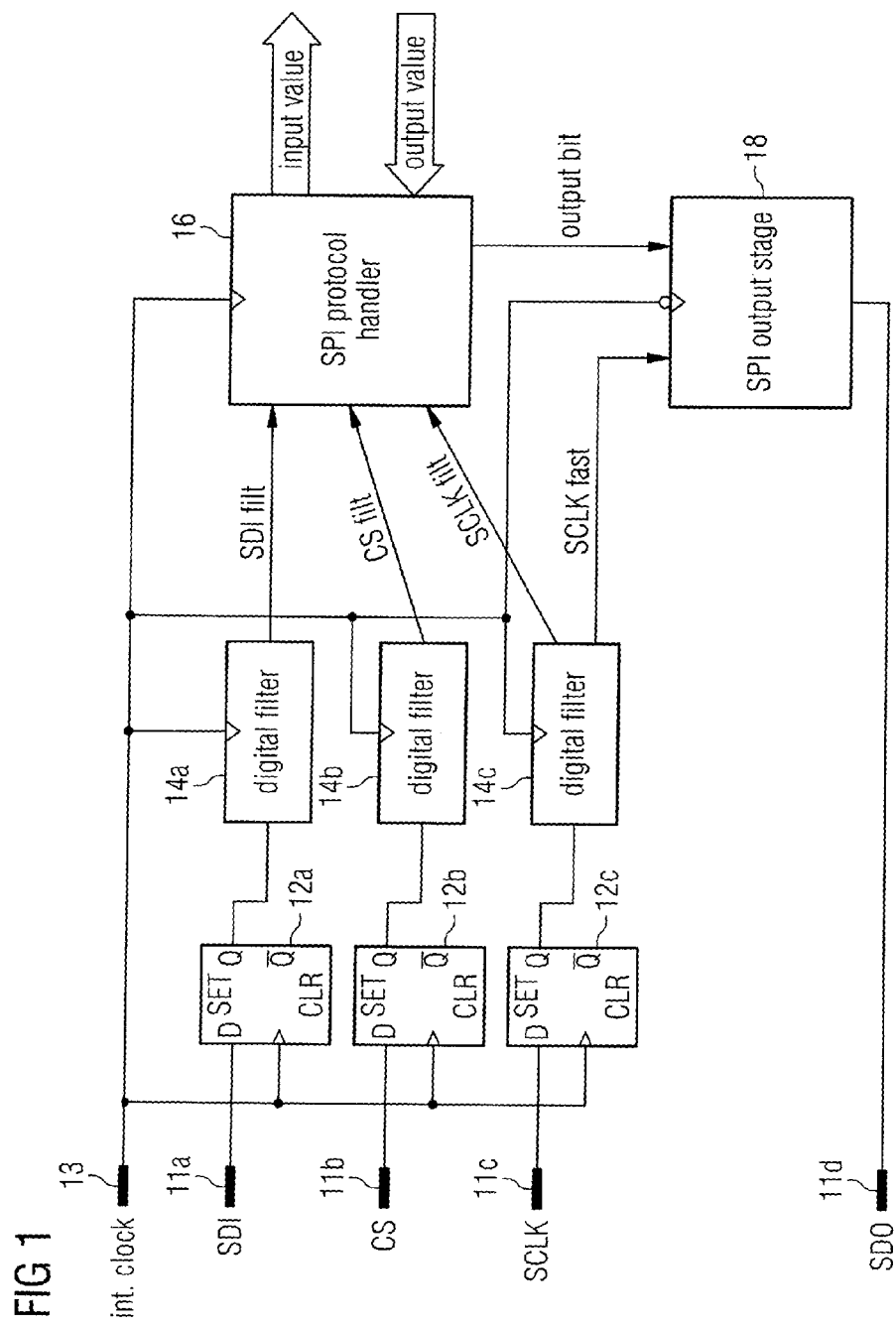

| | | | |
|---|---|---|---|
| 2009/0166419 A1* | 7/2009 | Patton | 235/439 |
| 2011/0022934 A1* | 1/2011 | Oh | G06F 1/10 714/798 |
| 2011/0153915 A1* | 6/2011 | Zitlaw | 711/103 |
| 2011/0235459 A1* | 9/2011 | Ware et al. | 365/233.11 |
| 2012/0013397 A1 | 1/2012 | Nagae | |
| 2012/0166677 A1* | 6/2012 | Obkircher | 710/3 |
| 2013/0198427 A1* | 8/2013 | Leitner et al. | 710/110 |

FOREIGN PATENT DOCUMENTS

| | | |
|---|---|---|
| JP | 2006060436 A | 3/2006 |
| KR | 20080006150 A | 1/2008 |
| TW | 583571 B | 4/2004 |

OTHER PUBLICATIONS

"TMS320DM646x DMSoC Serial Peripheral Interface (SPI)"; User's Guide; Texas Instruments; p. 1-80; Mar. 2011.

\* cited by examiner

SPI INTERFACE AND METHOD FOR SERIAL COMMUNICATION VIA AN SPI INTERFACE HAVING AN SPI PROTOCOL HANDLER FOR EVALUATING SIGNAL TRANSITIONS OF SPI SIGNALS

FIELD

The invention relates to serial communication with peripheral devices using the Serial Peripheral Interface (SPI) protocol, in particular to an SPI interface for a noisy environment and a method for serial communication via an SPI interface in a noisy environment.

BACKGROUND

The Serial Peripheral Interface (SPI) protocol is a widely used protocol for data transfer between integrated circuits (ICs), in particular, between a host processor, also called SPI master, and one or more peripherals, also called SPI slaves. The SPI protocol specifies four signals:
CS: chip select
SCLK: shift clock or serial clock
SDI: shift data in or serial data in
SDO: shift data out or serial data out
It is, however, to be appreciated that alternative naming conventions are also widely used.

The SPI protocol is a synchronous protocol which requires a defined timing for correct operation. If an SPI device is working in a noisy environment (e.g. power converters with large switching currents/voltages), glitches may occur on the SPI signals which cause timing violations on the SPI device. The behavior of a conventional SPI device, which receives a timing violation, is unknown. It depends on the implementation (use of analog filters, etc.), but, in the worst case, all flip-flops of the interface become metastable (i.e. the flip-flops are in an unstable state between the "low" and "high" state and will change to one of the stable states "low" or "high" after an undetermined period of time) and may cause random behaviour with severe consequences.

In a noisy environment, however, correct timing can not be guaranteed due to the unpredictability of random noise events. In conventional SPI devices, analog filters are commonly used to suppress glitches on the clock signal, but also the use of analog filters cannot totally exclude timing violations due to noise induced events. An analog filter, for example, may pass through a clock pulse which is too small resulting in SPI flip flops becoming metastable.

Therefore, there exists a need for a serial peripheral interface which is unsusceptible to timing violations due to e.g. noisy SPI signals and is thus suitable for applications in a noisy environment and a method for serial communication via an SPI interface which is unsusceptible to timing violations and is thus suitable for applications in a noisy environment.

SUMMARY

In accordance with an aspect of the invention, there is provided an SPI interface comprising a plurality of synchronizers configured to receive a plurality of SPI signals and an internal clock signal to synchronize the received SPI signals using the internal clock signal. The SPI interface also comprises an SPI protocol handler configured to receive the synchronized SPI signals and the internal clock signal and detect and evaluate signal transitions of at least one of the synchronized SPI signals according to an SPI protocol.

In accordance with a further aspect of the invention, there is provided a method for serial communication via an SPI interface. The method comprises receiving a plurality of SPI signals and an internal clock signal, synchronizing the plurality of SPI signals using the internal clock signal, and detecting and evaluating signal transitions of at least one of the synchronized SPI signals according to an SPI protocol.

Further features, aspects and advantages of the present invention will become apparent from the following detailed description of the invention made with reference to the accompanying drawings.

BRIEF DESCRIPTION OF THE DRAWING(S)

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

FIG. 1 exemplarily shows a simplified schematic diagram of an SPI interface according to an embodiment of the invention.

Figure 2:
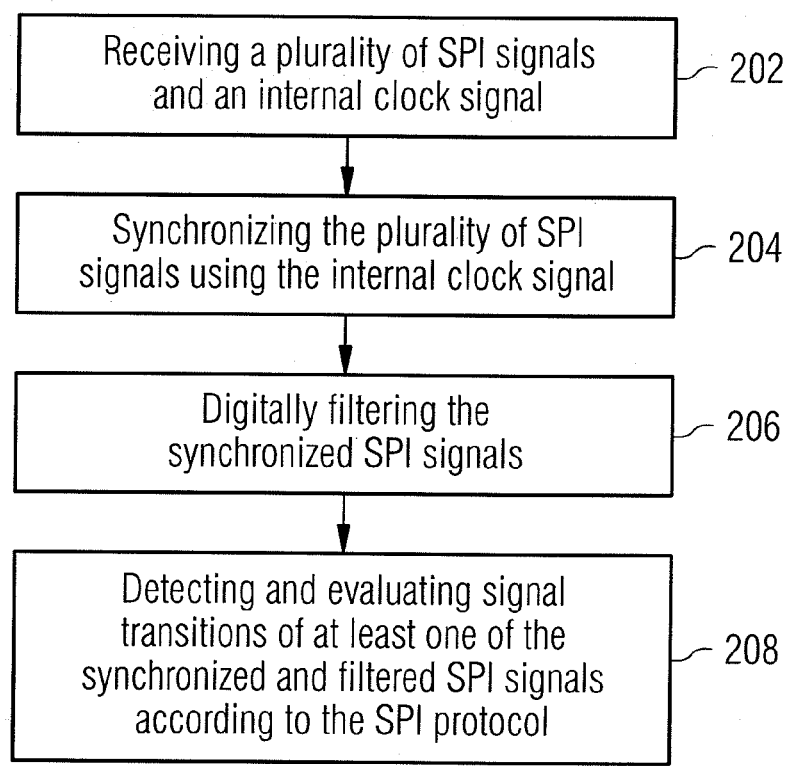

FIG. 2 shows an exemplary method according to an embodiment of the invention.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

FIG. 1 exemplarily shows a simplified schematic diagram of an SPI interface according to an embodiment of the invention.

The SPI interface illustrated in FIG. 1 comprises a serial data in (SDI) signal input 11a, a chip select (CS) signal input 11b, a serial clock (SCLK) signal input 11c, a serial data out (SDO) signal output 11d, an internal clock input 13, first, second and third synchronizers 12a, 12b and 12c, first, second and third digital filters 14a, 14b and 14c, an SPI protocol handler 16, and an output stage 18.

In the embodiment shown in FIG. 1 the synchronizers 12a, 12b and 12c, the digital filters 14a, 14b and 14c, the SPI protocol handler 16 and the SPI output stage 18 are connected to the internal clock signal input 13 to receive the internal clock signal. The internal clock signal is provided by an internal well-defined clock, for example, an on-chip oscillator which is not subjected to noise from outside of the chip. Thus, all devices of the SPI are clocked by a well-defined internal clock.

In one embodiment of the invention, the synchronizers 12a, 12b and 12c are synchronizer flip-flops. Synchronizer flip-flops are allowed to experience metastability for a certain time interval as they recover from the metastable state after a predefined recovery time. The length of the recovery time has to be smaller than the internal clock period so that the output or result of the synchronizer flip-flops is not used by other synchronous logic (e.g. digital filters and SPI protocol handler) before the predefined recovery time has elapsed.

The first synchronizer 12a is further connected to the SDI input 11a and the first digital filter 14a. The first synchronizer 12a receives an SDI signal from the SDI input 11a, synchronizes the received SDI signal and outputs the synchronized SDI signal to the first digital filter 14a.

The second synchronizer 12b is further connected to the CS input 11b and the second digital filter 14b. The second synchronizer 12b receives a CS signal from the CS input 11b, synchronizes the received CS signal and outputs the synchronized CS signal to the second digital filter 14b.

The third synchronizer 12c is further connected to the SCLK input 11c and the third digital filter 14c. The third synchronizer 12c receives an SCLK signal from the SCLK input 11c, synchronizes the received SCLK signal and outputs the synchronized SCLK signal to the third digital filter 14c.

The digital filters 14a, 14b and 14c may check whether a certain number (e.g. 3, 5, 8, etc.) of consecutive samples comprise the same value (e.g. 1) and, if so, output this value as filtering result. Alternatively, the digital filters 14a, 14b and 14c may check whether a certain ratio of a number of consecutive samples (e.g. 4 out of 5, 5 out of 7, etc.) comprise the same value (e.g. 1) and, if so, output this value as filtering result. It is, however, to be appreciated that the invention is not limited to the exemplary filter designs mentioned above but also other filter designs may be utilized.

The first digital filter 14a receives the synchronized SDI signal from the first synchronizer 12a, filters the synchronized SDI signal and outputs the synchronized and filtered SDI signal (SDI filt) to the SPI protocol handler 16.

The second digital filter 14b receives the synchronized CS signal from the second synchronizer 12b, filters the synchronized CS signal and outputs the synchronized and filtered CS signal (CS filt) to the SPI protocol handler 16.

The third digital filter 14c receives the synchronized SCLK signal from the third synchronizer 12c, filters the synchronized SCLK signal and outputs the synchronized and filtered SCLK signal (SCLK filt) to the SPI protocol handler 16. Additionally, the third filter also generates a separate SCLK signal (SCLK fast) which is output to the SPI output stage 18. This signal, SCLK fast, has a smaller delay than SCLK filt, i.e. SCLK fast has passed less filtering stages than SCLK filt has done.

Accordingly, all SPI input signals are synchronized by the synchronizers (in particular synchronizer flip-flops) 12a, 12b and 12c and filtered by the digital filters 14a, 14b and 14c to suppress e.g. single noise events before they get to the SPI protocol handler. Further, all SPI related flip-flops, hereinafter referred to as "SPI flip-flops", which are the flip-flops comprised in the SPI protocol handler, are clocked with the internal (well-defined) clock. In the SPI interface of FIG. 1 it is important that the internal clock is faster than the external SPI clock SCLK as, otherwise, the synchronizers 12a, 12b and 12c and digital filters 14a, 14b and 14c would loose some of the transitions contained in the SPI signals.

In one embodiment of the invention the digital filter stages of the digital filters 14a, 14b and 14c are equivalent so that the different synchronized and filtered SPI input signals are delayed by the same amount of time.

Advantageously, power consumption may be reduced by using clock gating, which, for example, may effect that the digital filters 14a, 14b and 14c are not clocked when the chip select signal is inactive.

In this context, it is to be appreciated that in certain embodiments of the invention the chip select signal is a "high-active" signal: When the CS signal is high, "chip select" is active, and when the CS signal is low "chip select" is inactive. In alternative embodiments the chip select signal may also be a "low-active" signal which may be referred to as "nCS signal". In this case, when the nCS signal is low, "chip select" is active, and when the nCS signal is high, "chip select" is inactive.

Hence, in the SPI interface shown in FIG. 1, external noise events or glitches (causing SPI timing violations) do not cause timing violations at the SPI flip-flops (i.e. the flip-flops contained in the SPI protocol handler 16). Otherwise the SPI flip-flops could become metastable due to external glitches which could cause random behaviour of the SPI flip-flops/SPI interface with severe consequences.

The synchronizer flip-flops are the only flip-flops comprised in the SPI interface shown in FIG. 1 which may experience metastability for a certain time interval as these synchronizer flip-flops recover from the metastable state after a predefined recovery time.

The SPI protocol handler 16 receives the synchronized and filtered SPI input signals SDI filt, CS filt, SCLK filt, detects signals transitions (i.e. rising/falling edges) in the received SPI input signals and evaluates the detected signal transitions according to the SPI protocol.

In one embodiment of the invention, the digital filters 14a, 14b and 14c additionally generate signals that indicate signal transitions (i.e. rising/falling edges) of the filtered SPI signals. In this case, the SPI protocol handler 16 receives the synchronized and filtered SPI input signals as well as the corresponding signals that indicate the signal transitions of the SPI input signals for evaluation from the digital filters 14a, 14b and 14c.

An exemplary evaluation of SPI input signals according to the SPI protocol will briefly be described in the following. An SDI access may start with an (e.g. rising) edge of the CS signal. At this point, a shift register comprised in the SPI protocol handler 16 is initialized, i.e. a parallel output value provided by an external source is sampled into the shift register of the SPI protocol handler 16.

The output stage 18 additionally receives a separate SCLK signal, SCLK fast, having a smaller intrinsic delay, which is less filtered than the SCLK signal provided to the SPI protocol handler, SCLK filt. Thus, the reaction time can be reduced so that the output stage 18 can provide the output bit to the SDO output 11d shortly after an (e.g. rising) edge of the SCLK signal.

The clock signal SCLK fast may comprise some timing variance as it is less filtered than SCLK filt. However, these timing variances can not lead to undefined states as the forwarded values (output bits) are solely provided (and thus defined) by the shift register of the SPI protocol handler which is clocked by the fully filtered SCLK filt signal.

Then, after an (e.g. falling) edge of the SCLK signal, the SDI value is "shifted" into the shift register and all bits contained in the shift register are shifted by one position such that the SDI value is sampled into the "first" position of the shift register and the bit located in the "last" position of the shift register, e.g. the MSB, is shifted out of the shift register whereas all other bits in the shift register are shifted by one position.

Again, the output stage 18 receives a separate SCLK signal, SCLK fast, having a smaller intrinsic delay, as it is less filtered than the SCLK signal provided to the SPI protocol handler, SCLK filt. Thus, the reaction time can be reduced so that the output stage can provide the output bit to the SDO output 11d shortly after a (e.g. rising) edge of the SCLK signal.

Then, after another e.g. falling edge of the SCLK signal, the next SDI value is "shifted" into the shift register and all bits contained in the shift register are shifted by one position such that the next SDI value is sampled into the "first" position of the shift register and the bit located in the "last" position of the shift register is shifted out of the shift register whereas all other bits in the shift register are shifted by one position.

The above steps are reiterated as long as the chip select signal is active (e.g. CS is high). When the chip select signal becomes inactive (e.g. CS changes to low) the access is completed and the content may be read out and provided as a parallel input value to another on-chip device. In certain embodiments, the chip select signal is active for a fixed number of SCLK cycles which equals the number of bits contained in the shift register so that the whole content of the shift register is replaced during a single SPI access, i.e. all "former" bits are shifted out and are replaced by a corresponding number of received SDI values successively sampled into the shift register.

In one embodiment of the invention, the SPI protocol handler additionally monitors the outputs of the digital filters in order to perform additional SPI protocol checks and/or evaluations, such as:
- checking whether there was an active edge on the chip select signal before the SPI clock started clocking;
- checking whether at least one (e.g. falling) edge of the SCLK signal occurred;
- checking whether a predefined number of (e.g. falling) edges of the SCLK signal occurred;
- evaluating time intervals between edges of the SCLK signal; and
- evaluating lengths of the SPI signals.

Based on the result of the SPI protocol checks and/or evaluations, the SPI protocol handler 16 determines whether the SPI access was valid or not. In case the access was invalid, the access is ignored and identified as invalid, i.e. all data received in this access is dropped, and the SPI protocol handler 16 advantageously sets an error flag bit.

Hence, the SPI interface shown in FIG. 1 ensures defined SPI behaviour by preventing external SPI signals from being (directly) connected to critical SPI flip-flop inputs. Even in the case of SPI timing violations during an access, defined SPI behaviour is guaranteed: If timing violations in an SPI access are detected, the respective SPI access is identified as corrupt, all data received in this access is dropped and an error flag may additionally be set.

FIG. 2 shows an exemplary method according to an embodiment of the invention. The method for serial communication via an SPI interface comprises: receiving a plurality of SPI signals and an internal clock signal at 202, and synchronizing the plurality of SPI signals using the internal clock signal at 204. The method further comprises digitally filtering the synchronized SPI signals at 206, and detecting and evaluating signal transitions of at least one of the synchronized and filtered SPI signals according to the SPI protocol at 208.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An SPI interface on a chip comprising:
a plurality of synchronizers configured to receive a plurality of SPI signals comprising an SPI serial clock signal (SCLK), and a further clock signal generated on the chip, and configured to synchronize the received SPI signals using the further clock signal to generate a synchronized SPI serial clock signal and a plurality of further synchronized SPI signals, wherein at least one of the synchronizers comprises a flip-flop adapted to receive the further clock signal at a clock input of the flip-flop, and the SPI SCLK at a data input of the flip-flop; and
an SPI protocol handler configured to receive the synchronized SPI serial clock signal and the plurality of further synchronized SPI signals and the further clock signal,
the SPI protocol handler further configured to detect whether or not an SPI protocol was violated based on whether or not there is an edge on at least one of the further synchronized SPI signals before the synchronized SPI serial clock signal (SCLK) starts clocking.

2. The SPI interface on a chip of claim 1, wherein the SPI protocol handler is further configured to determine whether the plurality of SPI signals form a valid access based on an evaluation of the signal transitions of the at least one of the received SPI signals.

3. The SPI interface on a chip of claim 2, wherein the SPI protocol handler is further configured to drop the plurality of SPI signals if the plurality of SPI signals do not form a valid access.

4. The SPI interface on a chip of claim 2, wherein the SPI protocol handler is further configured to set an error flag if the plurality of SPI signals do not form a valid access.

5. The SPI interface on a chip of claim 2, wherein the plurality of SPI signals further comprises a chip select (CS) signal, the SCLK signal and a serial data in (SDI) signal.

6. The SPI interface on a chip of claim 5, wherein the evaluation of the signal transitions of the at least one of the received SPI signals further comprises at least one of:
checking whether there was an edge on the CS signal before the SCLK signal started clocking;
checking whether at least one edge of the SCLK signal occurred;
checking whether a predefined number of either falling or rising edges of the SCLK signal occurred;
evaluating time intervals between edges of the SCLK signal; and
evaluating lengths of the SPI intervals.

7. The SPI interface on a chip of claim 1, wherein the synchronizers of the plurality of synchronizers are synchronizer flip-flops.

8. A method for serial communication via an SPI interface on a chip, where the SPI interface comprises a plurality of synchronizer flip-flops, the method comprising:
receiving a plurality of SPI signals comprising an SPI serial clock signal (SCLK) and a further clock signal, where the SPI SCLK signal is received at a data input of at least one of the plurality of synchronizer flip-flops;
synchronizing the plurality of received SPI signals using the further clock signal to generate a synchronized SPI serial clock signal and a plurality of further synchronized SPI signals; and
detecting whether or not an SPI protocol was violated based on whether or not there is an edge on at least one of the further synchronized SPI signals before the synchronized SPI serial clock signal (SCLK) starts clocking.

9. The method of claim 8, further comprising determining whether the plurality of SPI signals form a valid access based on the evaluation of the signal transitions of the at least one of the received SPI signals.

10. The method of claim 9, further comprising dropping the plurality of SPI signals if the plurality of SPI signals do not form a valid access.

11. The method of claim 9, further comprising setting an error flag if the plurality of SPI signals do not form a valid access.

12. The method of claim 9, wherein the plurality of SPI signals further comprises a chip select (CS) signal, the SCLK signal and a serial data in (SDI) signal.

13. The method of claim 9, further comprising evaluating the signal transitions of the at least one of the received SPI signals, wherein evaluating the signal transitions of the at least one of the received SPI signals further comprises at least one of:
   checking whether there was an edge on the CS signal before the SCLK signal started clocking;
   checking whether at least one edge of the SCLK signal occurred;
   checking whether a predefined number of either falling or rising edges of the SCLK signal occurred;
   evaluating time intervals between edges of the SCLK signal; and
   evaluating lengths of the SPI intervals.

14. An SPI interface on a chip comprising:
   a plurality of synchronizers configured to receive a plurality of SPI signals, comprising an SPI serial clock signal (SCLK) and a further clock signal and synchronize the received SPI signals using the further clock signal to generate a synchronized SPI serial clock signal and a plurality of further synchronized SPI signals, where the synchronizers of the plurality of synchronizers are synchronizer flip-flops, where at least one of the synchronizer flip-flops comprises a flip-flop adapted to receive the further clock signal at a clock input of the flip-flop, and the SPI SCLK at a data input of the flip-flop;
   a plurality of digital filters configured to receive and filter the synchronized SPI serial clock signal and the plurality of further synchronized SPI signals; and
   an SPI protocol handler configured to receive the synchronized and filtered SPI serial clock signal and the plurality of further synchronized SPI signals and the further clock signal,
   the SPI protocol handler further configured to detect whether or not an SPI protocol was violated based on whether or not there is an edge on at least one of the received further synchronized and filtered SPI signals before the synchronized and filtered SPI serial clock signal (SCLK) starts clocking.

15. The SPI interface on a chip of claim 14, wherein the SPI protocol handler is further configured to evaluate the signal transitions of the at least one of the received SPI signals, and determine whether the plurality of SPI signals form a valid access based on the evaluation of the signal transitions of the at least one of the received SPI signals.

16. The SPI interface on a chip of claim 15, wherein the SPI protocol handler is further configured to drop the plurality of SPI signals if the plurality of SPI signals do not form a valid access.

17. The SPI interface on a chip of claim 15, wherein the SPI protocol handler is further configured to set an error flag if the plurality of SPI signals do not form a valid access.

18. The SPI interface on a chip of claim 15, wherein the plurality of SPI signals further comprises a chip select (CS) signal, the SCLK signal and a serial data in (SDI) signal.

19. The SPI interface on a chip of claim 18, wherein the evaluation of the signal transitions of the at least one of the received SPI signals further comprises at least one of:
   checking whether there was an edge on the CS signal before the SCLK signal started clocking;
   checking whether at least one edge of the SCLK signal occurred;
   checking whether a predefined number of either falling or rising edges of the SCLK signal occurred;
   evaluating time intervals between edges of the SCLK signal; and
   evaluating lengths of the SPI intervals.

20. A method for serial communication via an SPI interface on a chip, where the SPI interface comprises a plurality of synchronizer flip-flops, the method comprising:
   receiving a plurality of SPI signals comprising an SPI serial clock signal (SCLK) and a further clock signal, where at least one of the synchronizer flip-flops comprises a flip-flop adapted to receive the further clock signal at a clock input of the flip-flop, and the SPI SCLK at a data input of the flip-flop;
   synchronizing the plurality of received SPI signals using the further clock signal;
   digitally filtering the synchronized SPI signals;
   receiving, by an SPI protocol handler, the synchronized and digitally filtered SPI signals and the further clock signal; and
   detecting whether or not an SPI protocol was violated based on whether or not there is an edge on at least one of the further synchronized and filtered SPI signals before the synchronized and filtered SPI serial clock signal starts clocking.

21. The method of claim 20, further comprising evaluating, by the SPI protocol handler, the signal transitions of the at least one of the received SPI signals, and determining, by the SPI protocol handler, whether the plurality of SPI signals form a valid access based on the evaluation of the signal transitions of the at least one of the received SPI signals.

22. The method of claim 21, further comprising dropping the plurality of SPI signals if the plurality of SPI signals do not form a valid access.

23. The method of claim 21, further comprising setting, by the SPI protocol handler, an error flag if the plurality of SPI signals do not form a valid access.

24. The method of claim 21, wherein the plurality of SPI signals further comprises a chip select (CS) signal, a serial clock (SCLK) signal and a serial data in (SDI) signal.

25. The method of claim 24, wherein the evaluation of the signal transitions of the at least one of the received SPI signals further comprises at least one of:
   checking whether there was an edge on the synchronized and digitally filtered CS signal before the synchronized and digitally filtered SCLK signal started clocking;
   checking whether at least one edge of the SCLK signal occurred;
   checking whether a predefined number of either falling or rising edges of the synchronized and digitally filtered SCLK signal occurred;
   evaluating time intervals between edges of the synchronized and digitally filtered SCLK signal; and
   evaluating lengths of the SPI intervals.

* * * * *